US012498673B2

(12) United States Patent
Fontana

(10) Patent No.: US 12,498,673 B2
(45) Date of Patent: Dec. 16, 2025

(54) TIMEPIECE WITH QUARTZ MOVEMENT IN OIL BATH

(71) Applicant: HI TEK OFFICE S.R.L., Lucca (IT)

(72) Inventor: Italo Fontana, Lugano (CH)

(73) Assignee: HI TEK OFFICE S.R.L., Lucca (IT)

( * ) Notice: Subject to any disclaimer, the term of this patent is extended or adjusted under 35 U.S.C. 154(b) by 333 days.

(21) Appl. No.: 18/039,015

(22) PCT Filed: Nov. 30, 2020

(86) PCT No.: PCT/IT2020/000078
§ 371 (c)(1),
(2) Date: May 26, 2023

(87) PCT Pub. No.: WO2022/113126
PCT Pub. Date: Jun. 2, 2022

(65) Prior Publication Data
US 2023/0359149 A1 Nov. 9, 2023

(51) Int. Cl.
*G04B 37/02* (2006.01)
*G04C 10/00* (2006.01)
*G04G 17/04* (2006.01)
*G04G 19/00* (2006.01)

(52) U.S. Cl.
CPC ............. *G04B 37/02* (2013.01); *G04C 10/00* (2013.01); *G04G 17/04* (2013.01); *G04G 19/00* (2013.01)

(58) Field of Classification Search
None
See application file for complete search history.

(56) References Cited

U.S. PATENT DOCUMENTS

| | | | |
|---|---|---|---|
| 3,792,578 | A | 2/1974 | Hetzel |
| 2012/0155230 | A1 | 6/2012 | Patt |

FOREIGN PATENT DOCUMENTS

| | | | | | |
|---|---|---|---|---|---|
| CH | 714995 | B1 | * 11/2019 | | ............ G04B 37/02 |
| DE | 3009624 | A1 | 9/1981 | | |
| FR | 2613849 | A1 | 10/1988 | | |
| GR | 20090100403 | A | * 1/2011 | | ............ G04B 37/02 |
| WO | 9635978 | A1 | 11/1996 | | |
| WO | 03083586 | A1 | 10/2003 | | |

OTHER PUBLICATIONS

Espacenet machine translation of CH 714995 (IDS foreign patent cite #2) (Year: 2025).*
Google machine translation of GR20090100403 (IDS foreign patent cite #4) (Year: 2025).*

* cited by examiner

*Primary Examiner* — Regis J Betsch
*Assistant Examiner* — Michael James Walker
(74) *Attorney, Agent, or Firm* — McGlew and Tuttle, P.C.

(57) ABSTRACT

Watch with quartz movement with oil bath lubrication, comprising a case body (2) arranged between a transparent cap (3) and a closure element (18) so as to delimit a fluid-tight capsule (1) in an oil bath; a dial (11) arranged inside the capsule (1) below the cap (3); a motor body (10) arranged inside the oil bath capsule (1) and comprising an electrically powered motor for performing the movement of the watch and gears (12) for transmitting the movement to the dial (11); a seat (13) arranged externally and fluid-tight with respect to said capsule to house an electric battery (8) for powering the motor.

10 Claims, 1 Drawing Sheet

TIMEPIECE WITH QUARTZ MOVEMENT IN OIL BATH

FIELD OF THE INVENTION

The invention relates to a watch with quartz movement provided with an innovative lubrication system in an oil bath, encapsulated inside the watch itself.

BACKGROUND ART

Watches are known in which the internal parts, dial and motor body, are immersed in a mineral oil bath, electrically insulating and suitable for the perennial lubrication of the gears.

In such watches the energy transmission for the movement of the gears is developed by a cell which powers the motor.

An example of this type of watch is known from publication WO9635978, which describes a watch with quartz movement provided with a case filled with an electrically insulating hydrophobic fluid, in which the crown opening acts as an inlet opening for the fluid and is sealed during assembly.

However, the systems of the known type have limitations due to both the encapsulation or filling of the watch with oil, and the replacement of the charge cell, which involves emptying the watch and therefore the impossibility of being performed by the user, requiring the intervention of a technician.

A first object of the invention is therefore to propose a watch with quartz movement in an oil bath, which solves the drawbacks of the known type of systems and which in particular also allows a user to quickly inspect and/or replace the charge cell without requiring the emptying of the oil.

It is also known that the mineral oil used is a natural insulator which tends to change in volume as the temperature changes.

For this reason, in order to compensate for the different thermal expansion between oil and the various parts of the watch, compensation systems have been designed, for example outlet chambers, known for example from publication US408078, or the insertion of gas bubbles inside the oil bath which serve to compensate the differential coefficients of expansion between case and fluid/oil, as known from the same publication WO9635978 mentioned above.

However, the systems of the known type have some drawbacks in relation to the effectiveness of the compensation due to thermal expansion differentials.

A further object of the present invention is therefore a watch with lubrication in an oil bath which guarantees an optimal compensation of the differential thermal expansion coefficients.

SUMMARY OF THE INVENTION

The invention addresses and solves the problems now cited by proposing a watch according to at least one of the appended claims.

The advantages obtained essentially consist in the fact that the charge cell is positioned inside the watch but is not immersed in the oil bath itself, allowing the inspection and/or rapid replacement of the cell itself without having to empty and refill the capsule.

A further advantage is that the compensation bubble guarantees an optimal behaviour of the watch when the temperature varies.

LIST OF DRAWINGS

Figure 1:
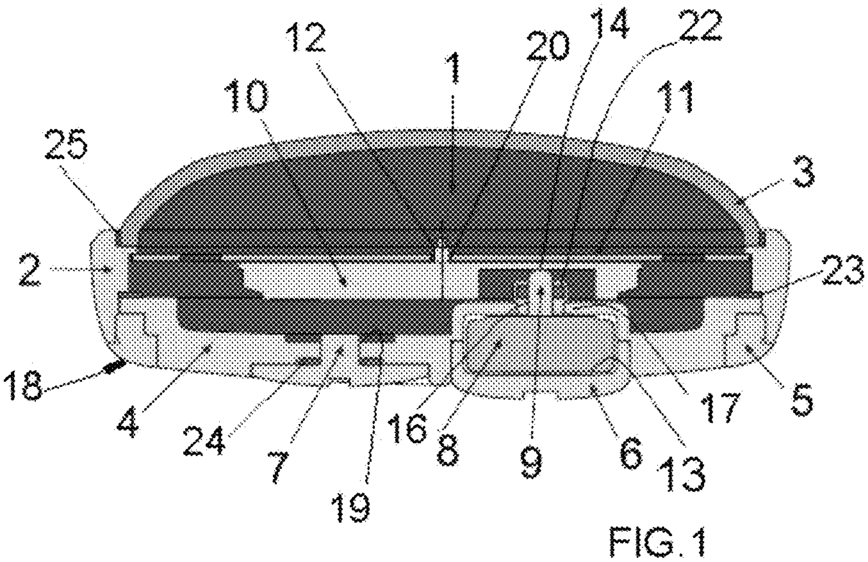
Figure 2A:
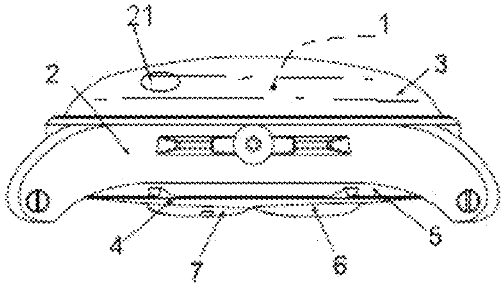
Figure 2B:
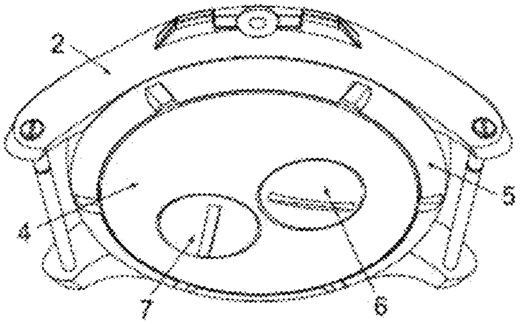
Figure 2C:
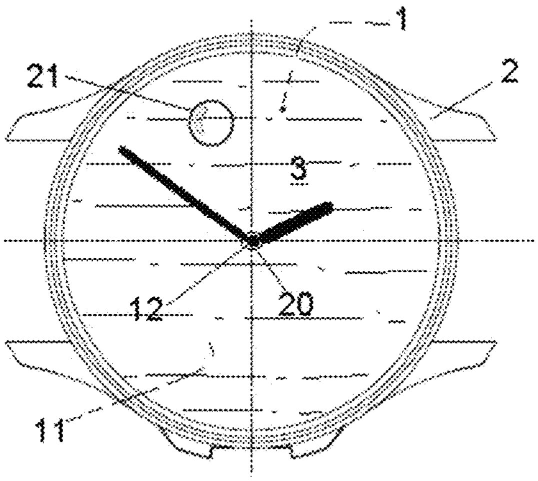

This and other advantages will be understood by those skilled in the art from the accompanying drawings, given as an exemplifying example, in which:

FIG. 1 schematically shows a sectional view of a watch according to the invention;

FIGS. 2*a*-2*c* show a perspective side view and a view from above of the watch of FIG. 1, respectively.

DETAILED DESCRIPTION

With reference to the attached drawings, a preferred embodiment of a watch with quartz movement with oil bath lubrication according to the invention is disclosed.

In the disclosed embodiment, the watch comprises a case body 2 arranged between a transparent cap 3 and a closure element 18 so as to delimit a fluid-tight capsule 1 in an oil bath, for example in a pressurized dielectric mineral oil bath.

Preferably, the cap is sapphire glass housed on the case body 2 with the interposition of an annular seal 25 and the closure element 18 comprises a pressurized bottom 4 pressed against the case body 2 with the interposition of an annular seal 23 by a ring nut 5 screwable to the case body 2.

However, it is understood that the capsule 1 can be delimited in another way and that the annular seals can be replaced by equivalent elements in order to maintain the fluid seal of the oil bath.

The watch further comprises a dial 11 arranged inside the capsule 1 below the cap 3 and a motor body 10 arranged inside the oil bath capsule 1 and comprising an electrically powered motor for executing the movement of the watch and gears 12 for transmitting the movement to the dial 11, passing through for example a central hole of the dial.

Outside the capsule 1 there is further provided a seat 13 adapted to house an electric battery or cell 8 to power the motor 10.

According to the invention, the seat 13 is fluid-tight separated with respect to said capsule 1 and electrical transmission means 9 are provided capable of transmitting the electrical signal from the battery 8 to an electrical contact point 14 of the motor 10 so as to execute the movement of the watch.

Advantageously, with this solution the seat of the cell 8 is kept isolated from the oil bath while still allowing the transmission of the electrical signal and it is possible to easily replace the cell 8 without using specific tools for emptying or pressurizing the capsule.

In addition, the disadvantages due to the execution of the emptying and filling operations of the capsule, such as the inclusion of air or other unwanted elements, are resolved.

In the disclosed embodiment, the electrical transmission means 9 comprise an electrically conductive pin 9, for example in copper, passing fluid-tightly through a hole 16 of a separation wall 17 of the seat 13 from the capsule 1 provided with a ring seal 22.

Thanks to this solution, the seat 13 remains isolated from the capsule 1 and the transmission of the electrical signal takes place in a simple and reliable manner thanks to the pin 9.

In the example disclosed, to change the battery or even simply for inspection, it will be sufficient to remove the screwable cover 6 from the seat 13 and remove the battery, with the pin 9 remaining in the position thereof, continuing to ensure fluid tightness with respect to the oil bath capsule.

In a preferred embodiment, the watch further comprises a filling hole 19 resealable by a removable screw 7 for the filling with the oil bath of the capsule 1 and sealingly screwable with the interposition of an annular seal 24.

Through the hole 19 it is therefore possible to easily fill the capsule with the chosen fluid, or oil, without technical complications.

In particular, it will be possible to fill the capsule with the creation of a gas bubble 21 useful for the compensation of the differential thermal expansion coefficients between the watch components and the filling oil for example when the clock is used in geographic areas or circumstances with very different temperatures.

The invention has been described with reference to a preferred embodiment, but equivalent modifications can be made without however departing from the scope of protection.

The invention claimed is:

1. A watch with quartz movement with oil bath lubrication, the watch comprising a case body arranged between a transparent cap and a closure element so as to delimit a fluid-tight capsule in an oil bath, a dial arranged inside the capsule below the transparent cap, a motor body arranged inside the oil bath capsule and comprising an electrically powered motor for executing the movement of the watch, gears for transmitting the movement to the dial, a seat arranged outside the capsule adapted to house an electric battery, wherein said seat is fluid-tight separated with respect to said capsule and electrical transmission means adapted to transmit an electrical signal from the battery to an electrical contact point of said motor.

2. A watch according to claim 1, wherein said electrical transmission means comprise an electrically conductive pin passing fluid-tightly through a hole of a separation wall of the seat from the capsule.

3. A watch according to claim 2, wherein the pin is a cylindrical pin passing through a ring seal arranged in the hole.

4. A watch according to claim 1, wherein said closure element comprises a pressurized bottom pressed against the case body with the interposition of an annular seal by means of a ring nut screwable to the case body.

5. A watch according to claim 1, further comprising a filling hole which can be sealingly closed by a removable screw to perform the filling of the capsule with the oil bath.

6. A watch according to claim 5, wherein said screw is sealingly screwable with the interposition of an annular seal.

7. A watch according to claim 1, wherein said seat can be closed by means of a screwable cover in order to allow the inspection and/or rapid replacement of the battery.

8. A watch according to claim 1, wherein said oil bath of the capsule comprises a gas bubble for compensating the differential thermal expansion coefficients between the components of the watch and the filling oil.

9. A watch according to claim 1, wherein said dial is provided with a hole for the passage of the movement transmission gears.

10. A watch according to claim 1, wherein said transparent cap is sapphire glass housed on the case body with the interposition of an annular seal.

* * * * *